Jan. 3, 1933.   V. W. PALEN   1,893,336
CIRCUIT CONTROL MEANS
Filed Jan. 14, 1929   2 Sheets-Sheet 2

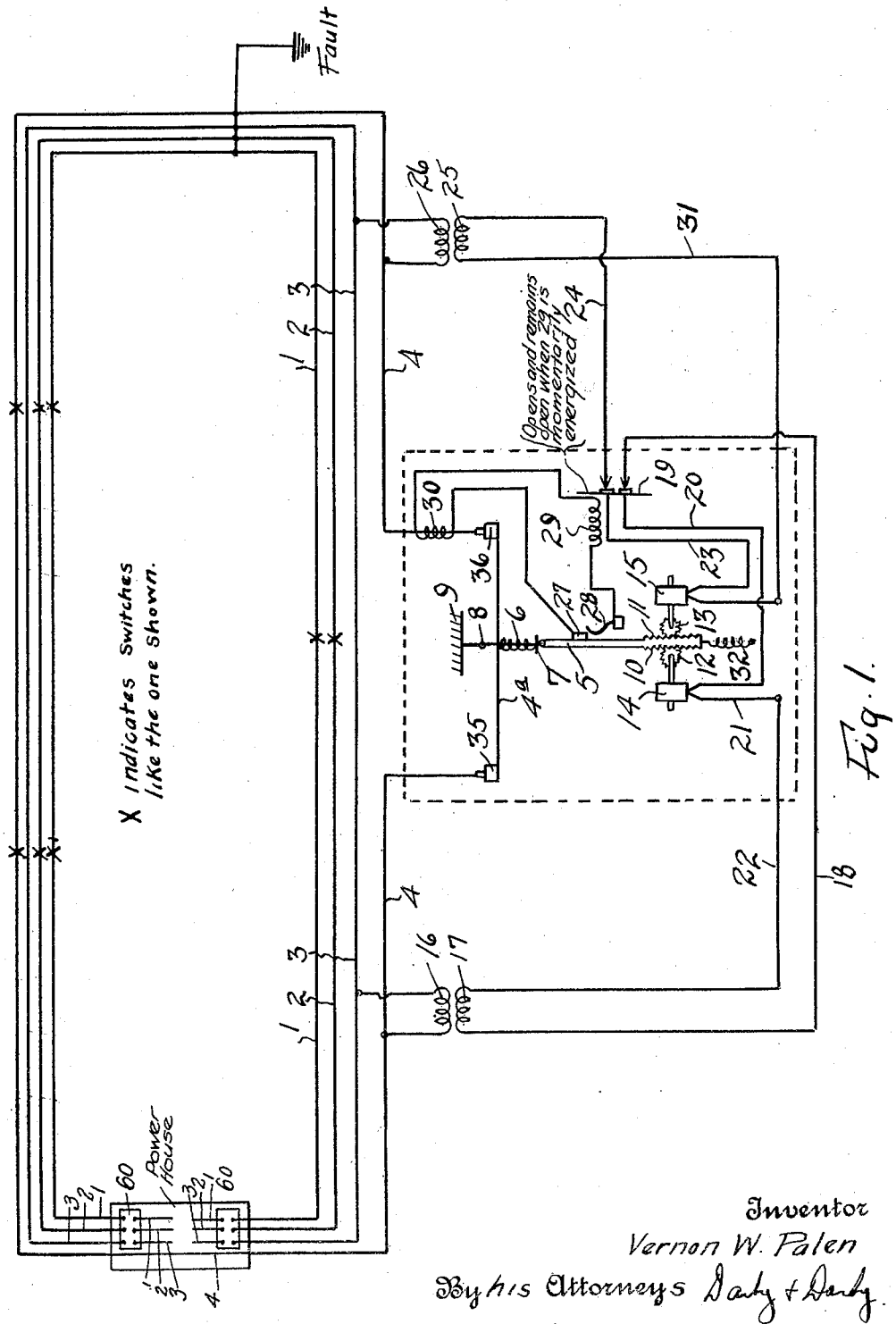

Inventor
Vernon W. Palen
By his Attorneys Darby & Darby

Patented Jan. 3, 1933

1,893,336

UNITED STATES PATENT OFFICE

VERNON W. PALEN, OF FLUSHING, NEW YORK

CIRCUIT CONTROL MEANS

Application filed January 14, 1929. Serial No. 332,443.

This invention relates in general to means for controlling the circuits of power lines.

One of the objects of this invention is the provision of a plurality of automatic switches arranged in the wires of a power line for the purpose of sectionalizing it.

A further object of this invention is the provision of a plurality of sectionalizing switches of this nature which are adapted to cut out a faulty section of the line so as to render the remainder of the line operative.

A still further object of the invention is the provision of switch means in a system of this nature which is automatically opened upon the occurrence of a fault on the section including this switch.

These and other objects as will appear from the following disclosure are secured by means of this invention.

This invention resides substantially in the combination, construction, arrangement and relative location of parts as will more fully appear hereinafter.

Figure 1 is a diagrammatic illustration of a power line to which the principles of this invention have been applied.

Figure 5:
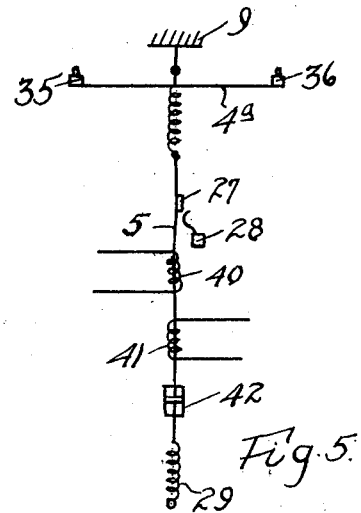
Fig. 5 is a diagrammatic illustration of a modified form of switch.

In power systems of the type now generally employed should a fault such as a short circuit occur on one or all of the wires of the line, the whole line and connected circuits is rendered inoperative until the fault is removed. The purpose of this invention is to provide a plurality of automatic switches at predetermined intervals along the line so as to sectionalize it. These switches are controlled by the current in the power line so that upon the occurrence of a fault on any section, the switches will all open automatically as well as the circuit breaker at the power house. Then when the circuit breaker at the power house is closed, the sectionalizing switches will close one at a time in rotation until the one on the faulty section closes when they will again all open together with the circuit breaker at the power house and in addition, in the two switches adjacent to the faulty section a magnetic switch will open permanently until the fault is repaired and the magnetic switch is closed by hand.

The circuit breaker at the power house is then closed and all the sectionalizing switches will close, excepting the two switches adjacent to the faulty section because in these two switches the magnetic switches are permanently opened.

A detail disclosure will now be given with reference to the drawings. The system shown is that of a three phase system with a neutral wire comprising the wires 1, 2, 3 and 4, wire 3 being the neutral. These wires extend from overload circuit breaker 60 at the power house which has been indicated generally in the drawings. Although not necessary, it is very common practice to use two circuit breakers on a loop feeder. In actual practice, it is often desirable and necessary to operate the feeder loop open at the center as two single feeders. This is easily accomplished by the use of two circuit breakers. Of course the same current source feeds the complete loop through both circuit breakers. The current source such as the generator or the power house bus bars of course connect to the wires 1, 2, 3 which extend between the circuit breakers 60 as shown. The wire 4 is interrupted at each sectionalizing point and connects to the fixed contacts 35 and 36. These contacts are bridged by a switch arm 4a slidably mounted on the plunger 5. The plunger 5 is provided with two stops 7 and 8, one on each side of the switch arm and a spring under compression 6 is placed between the switch arm and stop 7. The plunger 5 is mounted for sliding movement and is pulled in one direction by means of spring under tension 32 and is limited in its movement in the other direction by the fixed stop 9. Each side of the plunger 5 is provided at its lower end with racks 10 and 11 which mesh with the small gears 12 and 13 on the motors 14 and 15. The primary 16 of a local distribution transformer is connected between the wires 3 and 4. The secondary 17 is connected by wires 22 and 21 to one terminal of motor 14 and by wire 18 to a fixed contact of switch 19. On the other side of the sectionalizing switch and connected to wires 3 and 4 is the primary 26 of another local distribution transformer.

The secondary 25 of this transformer is connected by the wire 31 to one terminal of motor 15 and by wire 24 to the other fixed contact of switch 19. One contact of this switch 19 is connected by wire 20 to the other terminal of motor 14, and the other contact of this switch is connected by wire 23 to the other terminal of motor 15. Mounted on the plunger 5 is a fixed contact 27 connected to one terminal of the secondary of the current transformer 30. A fixed spring contact 28 is connected through the electro magnet 29 to the other terminal of the current transformer 30.

It will of course be understood that this equipment is provided at each sectionalized point for each phase. The other switches have been indicated by the legend X. The fault of any type has been indicated as a ground on the power system. The motors 14 and 15 will of course be specially designed in order to stand the overload when the plunger 5 strikes the fixed stop 9 to bring the motors to a dead stand still.

It will be of course further understood that three switches such as described one for each phase may be combined in one unit utilizing similar equipment to that described herein thus making one three phase switch replace the three single phase switches as shown herein at each sectionalizing point.

Figure 2:
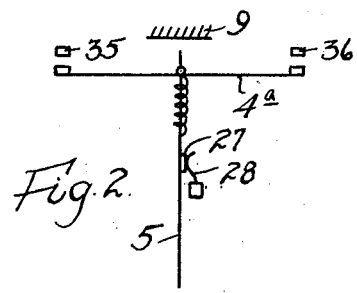
Figs. 2, 3 and 4 are diagrammatic illustrations of the various positions of the switch employed in connection with this invention.
Figure 3:
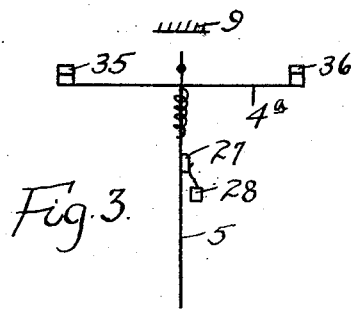
Figure 4:
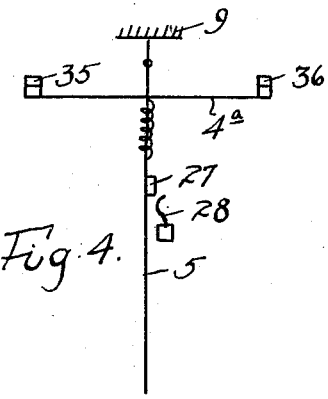

In the operation of the system when a fault occurs on the line so as to overload it the circuit breaker at the power house opens resulting in no voltage on the line. This deenergizes motors 14 and 15 and spring 32 pulls the plunger down so that the circuit in each phase is broken at the contacts 35 and 36. The operator in the power house then closes the circuit breaker and delivers currents in the first section so that the primary is energized. The current then flows from the secondary 17 through wires 22 and 18, switch 19 and wire 20 to motor 14. This motor then moves the plunger 5 upwardly. The first thing that occurs is that contact 28 touches contact 27 (Fig. 2). The next phase of this switch's operation is the bridging of contacts 35 and 36 as shown in Fig. 3 while contacts 27 and 28 are still touching. If the fault is not on the next section which is now energized, the switch continues in its upward movement until it reaches the position shown in Fig. 4 when the circuit connected to contacts 27 and 28 is broken. If as is the case in the drawings the fault is on the next section the overload current flowing through transformer 30 when the switch is in position shown in Fig. 3 energizes magnet winding 29 and throws switch 19 permanently out.

At the same time the circuit breaker in the power house opens. The operator then closes the circuit breaker and all the switches will close with the exception of those on each side of the fault since in these switches switch 19 is now open permanently thus disconnecting motors 14 and 15. The power system may then operate with the exception of the faulty section until the fault is removed. The man who removes the fault may then close switch 19 permitting the sectionalizing switches to close and connect this back in circuit. It will of course be apparent that when the fault first occurred and the circuit breaker at the power house opened, contacts 27 and 28 were not touching so that switch 19 did not open.

The modified form shown in Fig. 5 only differs from the form of Fig. 1 in that the plunger 5 is operated by means of the solenoid windings 40 and 41. Thus the winding 40 takes the place of motor 14 and the winding 41 takes the place of motor 15. A dash pot 42 in the arrangement would tend to slow up or retard the movements of the switch. The connections would otherwise be the same.

I am of course well aware that many changes in the details of construction and the method of employing the principles of this invention will readily occur to those skilled in the art and I do not therefore desire to be strictly limited to the disclosure given for purposes of illustration but rather to the scope of the appended claims.

What I seek to secure by United States Letters Patent is:

1. In a power system of the type described the combination comprising a main circuit breaker, a plurality of circuit wires, sectionalizing switches in said wires at predetermined points and means for maintaining each of said switches closed, said means being interconnected with the power line on each side of each of the sectionalizing switches, said means comprising two electric motors for each switch, one connected on one side of the switch to the power line and the other connected on the other side of the switch to the power line and both mechanically connected to said switch whereby when a short circuit occurs on the line causing the main circuit breaker to open, said motors will be deenergized permitting each switch to open said motors being energized by the sections to which they are connected under normal conditions.

2. In a power system of the type described the combination comprising an overload circuit breaker, a plurality of circuit wires, switches arranged at predetermined intervals in said circuit wires to break the circuit wires up into sections and two motive devices for operating each of said switches, one being connected to the section on one side of the switch and the other being connected to the section on the other side of the switch whereby the switches are maintained closed when power is on the line and are permitted to open upon occurrence of an overload which opens the overload circuit breaker both of said motive devices being energized under normal conditions.

3. In a power system of the type disclosed the combination comprising an electrical distribution system, a plurality of switches for dividing said distribution system into sections, motive means connected to said switches to operate them, connections between said motive means for each switch and the sections connected thereto, whereby energization of the motive means from both sections occurs simultaneously, cutout switches in said connections, and means controlled by said switches to permanently open the cut out switches, the cutout switch for any section being opened only when a fault occurs on that section.

4. In a power system of the type described the combination comprising an electrical distribution system comprising a number of wires, a plurality of sets of sectionalizing switches connected at separated points with said wires to sectionalize the system, power means for each switch connected to the sections adjacent that switch so as to be normally energized simultaneously from both sections to hold the switch closed, a cutout switch connected to the power means, electrical means connected to the adjacent section for operating said cutout switch, and means operated by the sectionalizing switch under short circuit conditions on the adjacent section to operate the cutout switch to permanently deenergize the power means until the short circuit condition is removed.

5. The combination of a pair of circuit-sections, a switch for connecting said sections, motive means connected with each of the circuit-sections for simultaneous energization therefrom for closing the switch, a relay and an auxiliary switch connected with each other and with said motive means to operate said means to close the switch when there is normal potential on one section except where in a previous closing operation one circuit-section has carried normal potential and the other section has been subjected to a condition establishing an abnormal current flow in it to cause the relay to permanently open the circuit to the motive means.

6. In a power system of the type described a pair of circuit sections, a sectionalizing switch for connecting the circuit sections together, motive means for operating said sectionalizing switch to connect said sections together, means energized from both circuit sections for energizing said motive means and means connected to one of said circuit sections and controlled by the sectionalizing switch for rendering said energizing means ineffective when said sectionalizing switch closes on a section in which an abnormal current is flowing to deenergize the motive means so that said sectionalizing switch will open.

7. In a power system of the type described a pair of circuit sections, a sectionalizing switch for connecting the circuit sections together, motive means for operating said sectionalizing switch to connect said sections together, circuit connections from both sections for energizing said motive means, a control switch in said connections and means energized from one of said sections and controlled by said sectionalizing switch for opening said control switch when the sectionalizing switch closes onto a circuit section in which an abnormal current is flowing.

In testimony whereof I have hereunto set my hand on this 11th day of January A. D. 1929.

VERNON W. PALEN.